US012573424B2

(12) United States Patent
Kumagai et al.

(10) Patent No.: US 12,573,424 B2
(45) Date of Patent: Mar. 10, 2026

(54) MAGNETIC DISK AND SUBSTRATE FOR MAGNETIC DISK

(71) Applicants: FURUKAWA ELECTRIC CO., LTD., Tokyo (JP); UACJ Corporation, Tokyo (JP)

(72) Inventors: Wataru Kumagai, Tokyo (JP); Hideyuki Hatakeyama, Tokyo (JP); Ryo Sakamoto, Tokyo (JP); Naoki Kitamura, Tokyo (JP); Kotaro Kitawaki, Tokyo (JP)

(73) Assignees: FURKAWA ELECTRIC CO., LTD., Tokyo (JP); UACJ Corporation, Tokyo (JP)

( * ) Notice: Subject to any disclaimer, the term of this patent is extended or adjusted under 35 U.S.C. 154(b) by 0 days.

(21) Appl. No.: 18/851,339

(22) PCT Filed: Mar. 6, 2023

(86) PCT No.: PCT/JP2023/008264
§ 371 (c)(1),
(2) Date: Sep. 26, 2024

(87) PCT Pub. No.: WO2023/189233
PCT Pub. Date: Oct. 5, 2023

(65) Prior Publication Data
US 2025/0218460 A1     Jul. 3, 2025

(30) Foreign Application Priority Data
Mar. 30, 2022     (JP) ................................. 2022-057540

(51) Int. Cl.
*G11B 5/73*     (2006.01)
*G11B 5/84*     (2006.01)

(52) U.S. Cl.
CPC ........ *G11B 5/73919* (2019.05); *G11B 5/8404* (2013.01)

(58) Field of Classification Search
None
See application file for complete search history.

(56) References Cited

U.S. PATENT DOCUMENTS 5,643,649 A * 7/1997 Hagan .................... C03B 32/00
65/117
2003/0172677 A1 * 9/2003 Miyamoto ............ C03C 21/002
65/30.14
(Continued)

FOREIGN PATENT DOCUMENTS

JP         2011225436 A     11/2011
JP          201316214 A     1/2013

*Primary Examiner* — Kevin M Bernatz
(74) *Attorney, Agent, or Firm* — CKC & Partners Co., LLC

(57)     ABSTRACT

The present invention intends to provide a magnetic disk that is flat while being thin and hardly causes physical errors. The present invention provides a magnetic disk having a hole in the center, a thickness of 0.60 mm or less, TIRs on circles having different radial distances r1 (mm) and r2 (mm) denoted by TIR1 ($\mu$m) and TIR2 ($\mu$m), and an amount of radial variation $\Delta$TIR for TIRs of 0.50 $\mu$m/mm or less in an outer circumferential region of the magnetic disk with r/R=0.70 to 0.99, where "R" is a disk radius (mm), "r" is a radial distance (mm) measured from the disk center, and the $\Delta$TIR is represented by an absolute value |(TIR1−TIR2)/(r1−r2)| of the ratio of the difference (TIR1−TIR2) between the TIR1 and the TIR2 to the difference (r1−r2) between r1 and r2 of the magnetic disk.

20 Claims, 4 Drawing Sheets

(56)　　　　　　References Cited

U.S. PATENT DOCUMENTS

| 2005/0233151 | A1* | 10/2005 | Feist ...................... | B82Y 10/00 |
| | | | | 428/141 |
| 2007/0243421 | A1* | 10/2007 | Machida ............... | B24B 37/042 |
| | | | | 428/846.9 |
| 2008/0193801 | A1* | 8/2008 | Haneda .............. | G11B 5/73921 |
| | | | | 428/846.9 |
| 2009/0136786 | A1* | 5/2009 | Aida ........................ | G11B 5/82 |
| | | | | 428/846.2 |
| 2010/0273030 | A1* | 10/2010 | Kitsunai .................. | G11B 5/82 |
| | | | | 427/128 |
| 2013/0102229 | A1* | 4/2013 | Nakae .................. | B24B 37/044 |
| | | | | 451/41 |
| 2021/0371327 | A1* | 12/2021 | Suzuki ...................... | B24B 1/00 |

* cited by examiner

S101 PREPARATION OF ALUMINUM ALLOY INGREDIENTS

S102 CASTING OF ALUMINUM ALLOY

S103 HOMOGENIZATION TREATMENT

S104 HOT ROLLING

S105 COLD ROLLING

S106 PUNCHING-OUT

S107 PRESSURIZATION AND PLANARIZATION TREATMENT

S108 CUTTING

S109 GRINDING

S110 ZINCATE TREATMENT

S111 Ni-P PLATING TREATMENT

S112 ROUGH POLISHING

S113 FINE POLISHING

S114 ADHESION OF MAGNETIC MATERIAL

MAGNETIC DISK AND SUBSTRATE FOR MAGNETIC DISK

TECHNICAL FIELD

The present invention pertains to a magnetic disk and a substrate for a magnetic disk. In more detail, the present invention pertains to a magnetic disk that has a small amount of radial variation for TIR while being thin, is flat, and is less likely to cause physical errors, in particular to a magnetic disk such as a hard disk that is mounted to a data center, a computer, or the like; and pertains to a substrate for a magnetic disk, such as an aluminum alloy substrate or a glass substrate, for example.

BACKGROUND ART

Hard disk drive (may be written as "HDD" below) apparatuses are frequently used as storage apparatuses for data centers, computers, or the like. In recent years, the amount of recorded data has rapidly increased due to the spread of smartphones or smart appliances, the promotion of IoT, and the rapid spread of cloud computing. Such a massive amount of data is read from and written to HDD apparatuses in data centers through the Internet. Larger capacity for HDD apparatuses is required in order to record enormous amounts of data.

A magnetic disk for recording data is used in an HDD apparatus. As one technique for realizing larger capacity for an HDD apparatus, consideration has been given to reducing the thickness of magnetic disks and increasing the number of magnetic disks mounted in an HDD apparatus. As another technical trend, consideration is also being given to a technique for increasing the diameter of a magnetic disk and moving a data region on the disk surface to the radially outward edge as much as possible, whereby the data region for one magnetic disk is enlarged.

When the plate thickness of a magnetic disk is simply made to be thinner, the rigidity thereof decreases. Therefore, there is a tendency for greater deformation by the magnetic disk to arise in a case where vibration (fluttering) or an impact is imparted when the magnetic disk is rotated. Accordingly, in an HDD apparatus in which there are mounted many thin magnetic disks including an aluminum alloy substrate or a glass substrate, for example, the interval between magnetic disks or the interval between a magnetic disk and a member such as a magnetic head narrows, and contact between magnetic disks or between a magnetic disk and a magnetic head is more likely to occur. As a result, an error when reading or writing is likely to occur. In order to reduce the number of physical errors in such an HDD apparatus, several studies have been carried out regarding planarizing magnetic disks.

For example, Patent Document 1 discloses a technique for regulating the TIR or the amount of deviation for the height at the outer circumferential edge of a substrate for a magnetic disk in order to suppress HDD head crashes. Here, TIR is an index that indicates the flatness of a surface. The TIR at an outer circumferential edge indicates, when a plane that optimally fits the main surface at the outer circumferential edge of a substrate is obtained by least squares and the height at the outer circumferential edge of the substrate is measured in the circumferential direction, the difference (a PV value) between the highest point (P) at which the height is above the plane and the lowest point (V) at which the height is below the plane. Patent Document 2 discloses a technique for finely polishing a glass substrate having a specific composition such that the TIR for two predetermined radii is a specified value or less.

CITATION LIST

Patent Document

Patent Document 1: Japanese Unexamined Patent Application, Publication No. 2013-16214
Patent Document 2: Japanese Unexamined Patent Application, Publication No. 2011-225436

DISCLOSURE OF THE INVENTION

Problems to be Solved by the Invention

Conventionally, the planarity of a magnetic disk is defined by the flatness, waviness, a TIR value on the circumference at an arbitrarily defined position, or the like for the entire surface of a substrate. For example, flatness is evaluated using a TIR for a time of measuring circumferentially in both of Patent Documents 1 and 2. However, new problems that have not been present so far have become apparent in conjunction with the thinning and increases in the size of magnetic disks in recent years. In a case where plate thickness is simply reduced and set to 0.60 mm or less, for example, deformation of a magnetic disk when an impact is imparted or vibration (fluttering) when the magnetic disk is rotated increase, whereby the frequency at which physical errors occur for the magnetic disk increases. In addition, there arises a case where it is not possible to clearly determine whether a read/write error is within an allowed range when evaluating the magnetic disk. Substrates considered in Patent Documents 1 and 2 are sized such that the outer diameter is comparatively small at 2.5 inches (approximately 65 mm) or less and the thickness exceeds 0.635 mm, for example. Accordingly, it was possible to avoid physical errors by prescribing only, inter alia, the TIR of the outer circumferential edge. However, just this is insufficient as a measure for avoiding errors for a large and thin magnetic disk.

In HDD apparatuses in recent years, the distance between a magnetic disk and a head when the HDD is operating has also shortened. For example, in the case of a thin magnetic disk having a thickness of approximately 0.60 mm or less, a head that reads and writes while flying/moving above a main surface may become unstable due to fluctuation of the shape of the main surface, inducing an operational error such as a read/write error. Accordingly, in a substrate for an HDD in which there is a short distance between the substrate and a head, consideration must also be given to the shape of the main surface and not just the outer circumferential edge. In particular, when the region from near the center in the radial direction on the main surface to an outermost circumferential section is not flat, an error when the HDD operates is more likely to occur.

An object of the present invention is to provide a magnetic disk and a substrate for a magnetic disk that are flat while being thin, are less likely to suffer physical errors, and are capable of supporting higher capacities for hard disks.

Means for Solving the Problems

As a result of diligent study, the inventors have found that a magnetic disk can be prevented from causing physical errors, even it is thin with a thickness of 0.60 mm or less, by forming the magnetic disk to have a radial variation for TIRs not more than a predetermined value, which are each measured for a plurality of concentric circles within a specific region on the magnetic disk, and can cope with increasing of the capacity of a hard disk thereby, thus accomplishing the present invention.

To achieve the object described above, a summary configuration of the present invention is as follows.

(1) A magnetic disk that has a hole at a central portion of the magnetic disk, wherein the magnetic disk has a thickness of 0.60 mm or less, a radius denoted by R (mm), TIRs measured on circles having different radial distances r1 (mm) and r2 (mm) on the magnetic disk denoted by TIR1 ($\mu$m) and TIR2 ($\mu$m), respectively, and an amount of radial variation $\Delta$TIR for TIRs of 0.50 $\mu$m/mm or less in an outer circumferential region of the magnetic disk at which r/R is 0.70 to 0.99, where "r" is a radial distance (mm) on the magnetic disk that is measured from the center of the magnetic disk, and the $\Delta$TIR is represented by $|(TIR1-TIR2)/(r1-r2)|$, which is an absolute value of a ratio of a difference (TIR1$-$TIR2) between the TIR1 and the TIR2 with respect to a difference (r1$-$r2) between the radial distance r1 of the magnetic disk and the radial distance r2 of the magnetic disk.

(2) The magnetic disk according to (1) described above, a flatness PV being 20.0 $\mu$m or less.

(3) The magnetic disk according to (1) or (2) described above, an outer diameter dimension being 95 mm or more.

(4) A substrate used in the magnetic disk according to any of (1) to (3) described above.

(5) A method of manufacturing the magnetic disk according to any of (1) to (3) described above, the magnetic disk being manufactured from an aluminum alloy substrate, the method of manufacturing the magnetic disk including a grinding step of grinding the aluminum alloy substrate, and the grinding step being performed under conditions of an applied pressure being 50 to 120 g/cm$^2$, a surface plate rotation speed being 10 to 35 rpm, and a coolant flow rate being 1 to 10 L/minute.

(6) A method of manufacturing the magnetic disk according to any of (1) to (3) described above, the magnetic disk being manufactured from a glass substrate, the method of manufacturing the magnetic disk including a grinding step of grinding the glass substrate, and the grinding step being performed under conditions of an applied pressure being 100 to 200 g/cm$^2$, a surface plate rotation speed being 10 to 35 rpm, and a coolant flow rate being 1 to 10 L/minute.

(7) The method of manufacturing a magnetic disk according to (5) or (6) described above, an amount of grinding being 2.5 to 25 $\mu$m in the grinding step.

(8) The method of manufacturing a magnetic disk according to any one of (5) to (7) described above, wherein the grinding step includes flipping the aluminum alloy substrate or the glass substrate over at least once, and the flipping is followed by continuing the griding.

(9) The method of manufacturing a magnetic disk according to any one of (5) to (8) described above, further comprising, after the grinding step, a polishing step of polishing the aluminum alloy substrate or the glass substrate, wherein the polishing step includes flipping the aluminum alloy substrate or the glass substrate over at least once, and the flipping is followed by continuing the polishing.

Effects of the Invention

By virtue of the present invention, it is possible to provide a magnetic disk, which is very flat and for which $\Delta$TIR is 0.50 $\mu$m/mm or less while being thin and having a thickness of 0.60 mm or less, and thus crashes between adjacent disks are less likely to occur. Accordingly, more sheets of magnetic disks can be mounted in an HDD apparatus according to the present invention, enabling an increase in the capacity of a hard disk to be supported. A magnetic disk according to the present invention is capable of being increased in size, and the outer diameter thereof can be set to 95 mm or more, for example. Moreover, usage as a data region until the very limit of the outer circumferential edge of the disk is possible, and this feature can also contribute to increasing the capacity of a hard disk. Furthermore, a magnetic disk according to the present invention is less likely to suffer a head crash even if mounted in an HDD apparatus in which there is a short distance between the magnetic disk and a head, and an error when the HDD apparatus is operating is less likely to occur. Accordingly, a magnetic disk according to the present invention is suitable as a magnetic disk for a hard disk that is mounted in, in particular, a data center, a computer, or the like.

PREFERRED MODE FOR CARRYING OUT THE INVENTION

Description is given in detail below regarding a magnetic disk according to the present invention.

<Magnetic Disk>

A magnetic disk according to the present invention has a hole at a central portion of the magnetic disk, the thickness of the magnetic disk being 0.60 mm or less, the radius of the magnetic disk denoted by R (mm), TIRs measured on circles having different radial distances r1 (mm) and r2 (mm) on the magnetic disk denoted by TIR1 ($\mu$m) and TIR2 ($\mu$m), respectively, and an amount of radial variation $\Delta$TIR for TIRS being 0.50 $\mu$m/mm or less in an outer circumferential region of the magnetic disk at which r/R is 0.70 to 0.99, where "r" is a radial distance (mm) on the magnetic disk that is measured from the center of the magnetic disk, and the $\Delta$TIR is represented by $|(TIR1-TIR2)/(r1-r2)|$, which is an absolute value of the ratio of the difference (TIR1−TIR2) between the TIR1 and the TIR2 with respect to the difference (r1−r2) between the radial distance r1 of the magnetic disk and the radial distance r2 of the magnetic disk.

In a magnetic disk according to the present invention as described above, an important requirement is for the amount of radial variation ΔTIR for the TIR in the outer circumferential region to be 0.50 μm/mm or less. In a case where the plate thickness of a magnetic disk is thin and less than or equal to 0.60 mm in particular, a physical error is more likely to arise when the ΔTIR is greater than 0.50 μm/mm in the outer circumferential region. In contrast, a physical error is less likely to arise in a magnetic disk according to the present invention for which the ΔTIR is 0.50 μm/mm or less, despite the thickness being 0.60 mm or less.

Figure 1:
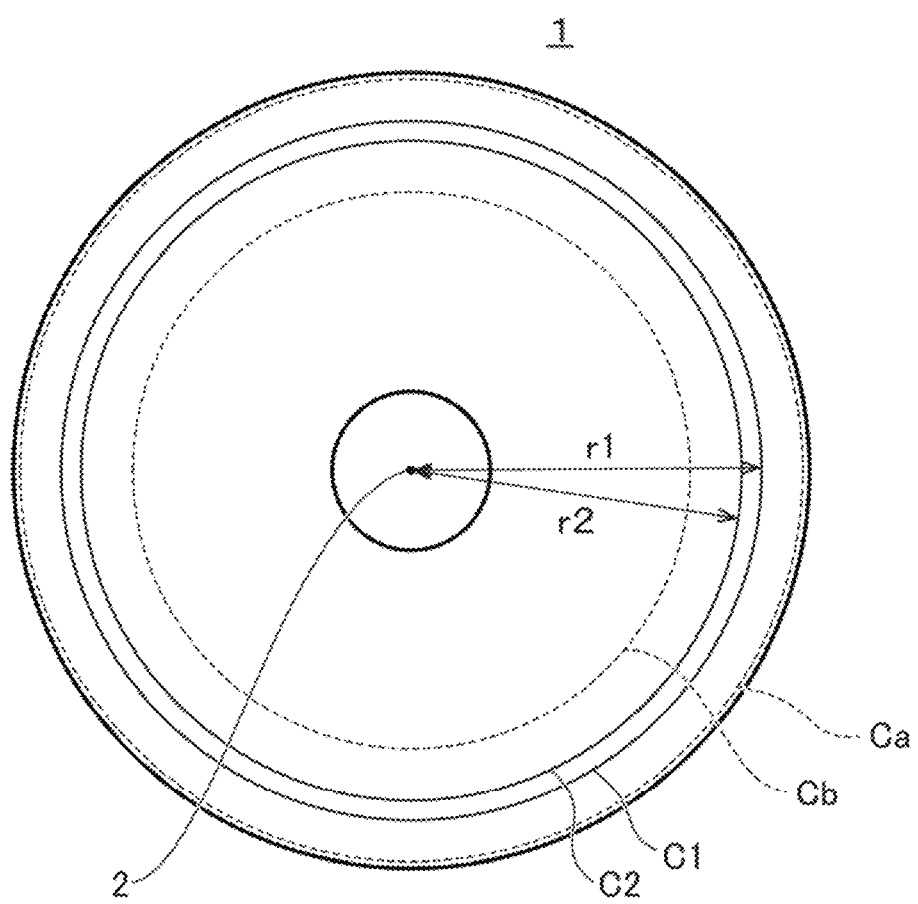
FIG. 1 is a conceptual diagram for describing an outer circumferential region and a location for measuring the amount of radial variation for TIR, in a magnetic disk according to the present invention.

Here, the "outer circumferential region" indicates a region for which the ratio r/R between the radial distance r of the magnetic disk measured from the center of the magnetic disk as described above, and the radius R of the magnetic disk is 0.70 to 0.99. FIG. 1 is a conceptual diagram for describing an outer circumferential region and a location for measuring the amount of radial variation for TIR, in a magnetic disk according to the present invention. Taking a magnetic disk 1 that is illustrated in FIG. 1 as an example, there are two concentric circles that are illustrated by broken lines. A region demarcated by an outer circle Ca that is at a position where the ratio r/R is 0.99 and an inner circle Cb that is at a position where the ratio r/R is 0.70 is the outer circumferential region.

<Amount of Radial Variation of TIR>

The amount of radial variation of TIR indicates by how much TIR changes due to differences in radial distance when the TIRs are respectively measured at the circumferences of two concentric circles that are on the surface of a magnetic disk and have different radial distances. To describe by taking the magnetic disk 1 illustrated in FIG. 1 as an example, TIRs are measured at the circumference of concentric circles C1 and C2 having different radial distances r1 (mm) and r2 (mm) within an outer circumferential region on the main surface of the magnetic disk 1 respectively to thereby obtain TIR1 (μm) and TIR2 (μm). Next, the difference between TIR1 and TIR2 is divided by the difference between r1 and r2, and the absolute value of the result thereof is set as an amount of radial variation ΔTIR for the TIRs, as in the following (formula 1).

$$\Delta TIR = \left| (TIR1 - TIR2)/(r1 - r2) \right|. \qquad \text{(formula 1)}$$

(TIR)

Figure 2:
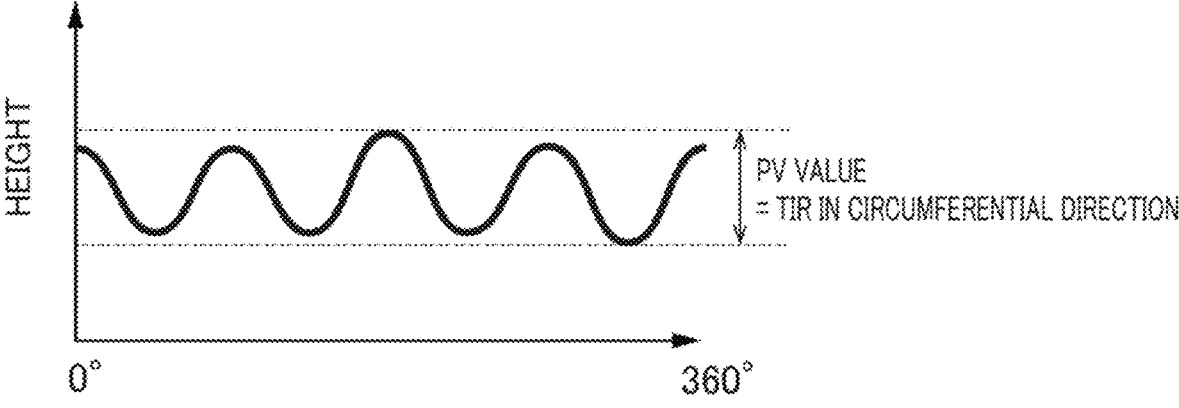
FIG. 2 is a conceptual diagram that illustrates an example of a graph resulting from plotting height measured in the circumferential direction on one of the concentric circles Ca and Cb in FIG. 1 with respect to angle at a measurement location.

TIR is an abbreviation of Total Indicated Reading, and is an index that indicates the flatness of a surface. Taking the magnetic disk in FIG. 1 as an example, firstly, a plane optimally fitted to the main surface of the magnetic disk is obtained by least squares. Next, the height (unevenness) of the main surface of the magnetic disk at a portion for the concentric circles Ca or Cb is measured in the circumferential direction. FIG. 2 is a conceptual diagram that illustrates an example of a graph resulting from plotting height measured in the circumferential direction with respect to an angle at a measurement location. Here, the difference (PV value) between the highest point (P) at which the height is above the plane and the lowest point (V) at which the height is below the plane is the TIR at the circumference. It may be that TIR is measured at the circumference for the same radius on both main surfaces, and the higher value is set as the TIR at the circumference.

(ΔTIR)

TIR measurement at the circumference as described above is performed for a plurality of concentric circles having different radial distances, and to what level the TIR changes for each radial distance is the amount of radial variation ΔTIR, the value of which is calculated in accordance with (formula 1) described above. Accordingly, ΔTIR is a number that includes fluctuation in the height in the radial direction as well as fluctuation in the height at a specific circumference (for example, the outer circumference) for a magnetic disk. In other words, ΔTIR becomes an index that indicates fluctuation (roughness, waviness, unevenness, etc.) in the height of a magnetic disk in both of the circumferential direction and the radial direction. It can be said that the closer ΔTIR is to 0—in other words the smaller the absolute value of ΔTIR, the flatter the magnetic disk and the less likely physical errors will arise due to a crash or the like.

In a magnetic disk according to the present invention, as the amount of radial variation ΔTIR, a value for an outer circumferential region of a magnetic disk as described above—in other words a region for which r/R is 0.70 to 0.99—was used. According to findings by the inventors, there is a tendency for the surface of the magnetic disk to not be smooth in this region in particular. A glass or metallic substrate is subjected to grinding/polishing in the manufacture of a magnetic disk, but the outer circumferential region is a portion where, in particular, roughness is more likely to change in a grinding/polishing step. Accordingly, a magnetic disk that has a low amount of radial variation ΔTIR in the outer circumferential region can be evaluated as a flatter magnetic disk that has superior grinding/polishing precision.

A magnetic disk according to the present invention has a very low ΔTIR as described above at 0.50 μm/mm or less in the outer circumferential region and is thin having a thickness of 0.60 mm or less, thus achieving the effects of hardly causing a crash between a magnetic disk and a head that are adjacent to each other inside an HDD apparatus to reduce the occurrence of a physical error. From a perspective of further reducing physical errors, it is desirable for ΔTIR for a magnetic disk according to the present invention to be 0.40 μm/mm or less, more desirably 0.30 μm/mm or less, and even more desirably 0.20 μm/mm or less.

(Magnetic Disk Shape Evaluation Method)

The surface shape of a magnetic disk in terms of, inter alia, the above-described TIR can be evaluated by a general-purpose optical measurement apparatus, for example. There is no particular limit on the evaluation method or inspection apparatus. For example, FT-17 (a product name) made by Nidec Corporation, Mesa (a product name) made by Zygo Corporation, FM-200 made by Tropel Corporation, or the like is desirably used.

In order to make a magnetic disk according to the present invention less susceptible to physical errors, it is preferable to use a plurality of ΔTIRs to make an evaluation. In a magnetic disk having an outer diameter of 95 mm (and a radius R of 47.5 mm), for example, three amounts of radial variation ΔTIR are calculated from TIRs on concentric circles for which a distance r from the center is 40 mm (r/R=84%), 45 mm (r/R=95%), 46 mm (r/R=97%), and 47 mm (r/R=99%). In the case of a magnetic disk for which the absolute values of these three ΔTIRs are all 0.50 μm/mm or less, it is possible to provide an HDD apparatus that has even fewer operational errors and has higher reliability.

<Magnetic Disk Flatness>

It is desirable for the value of a flatness PV to be low for a magnetic disk according to the present invention. When the PV is low, specifically in the case of a magnetic disk where the PV is 20.0 μm or less, there is a low risk of a crash and a physical error is less likely to occur, even if many magnetic disks are mounted within an HDD apparatus. In addition, it is also desirable for PV to be as low as possible from a perspective of shape evaluation. In a case of measuring the surface shape of a magnetic disk by an optical inspection apparatus when the flatness PV is large, in an optical system in which measurement light emitted from the inspection apparatus is reflected by the surface of the magnetic disk and returns to a sensor in the inspection apparatus, it may be that some of the reflected measurement light does not return to the sensor in the inspection apparatus and it ceases to be possible to evaluate the surface shape of a desired region. In contrast, in the case of a magnetic disk having a low PV that is, for example, 20.0 μm or less, it becomes possible to use an optical inspection apparatus to evaluate the surface shape without issue.

Here, similarly to the TIR for the circumference as described above earlier, when a plane that is optimally fitted to the main surface of a magnetic disk is obtained by least squares and the height (roughness) of a main surface of the magnetic disk is subsequently measured over the entirety of the surface, the flatness PV is a value for the difference between a highest point (P) and a lowest point (V). The flatness PV represents not only the surface roughness of the magnetic disk, but also the flatness of the entire disk including the waviness, unevenness, and the like of the magnetic disk main body. In the case of a magnetic disk for which ΔTIR is 0.50 μm/mm or less and the flatness PV is low at 20.0 μm or less, for example, there is little risk of a crash and an operational error is less likely to occur even if many of such magnetic disks are mounted within an HDD apparatus. From a perspective of reducing physical errors, it is more desirable for the flatness PV of a magnetic disk according to the present invention to be 15.0 μm or less, and particularly 10.0 μm or less. Here, it may be that the flatness is measured at both main surfaces, and the higher value is adopted as a measured flatness of the substrate.

<Magnetic Disk Size>

Surfaces of a magnetic disk according to the present invention as described above are very flat. Therefore, an effect of crashes being less likely even if many of such magnetic disks are mounted within an HDD apparatus is achieved. Effects of the present invention become prominent in a thin magnetic disk having a thickness of 0.60 mm or less, in particularly 0.50 mm or less or 0.48 mm or less, or even 0.38 mm or less. Such a thin substrate has a lower rigidity in comparison to a magnetic disk that is thicker than this substrate. Therefore, the flatness thereof greatly impacts the reliability of a hard disk. Due to similar reasons, the effects of the present invention become prominent in a magnetic disk for which the outer diameter (diameter) is, for example, 65 mm or more, and particularly 95 mm or more.

A magnetic disk according to the present invention is flat in the radial direction as well as the circumferential direction, and thus also has a reduced risk of suffering an increase in the waviness or unevenness of the outer circumferential region in conjunction with an increase in the size (enlarged radius) of a disk, which gives rise to a crash. Accordingly, a magnetic disk according to the present invention is suitable as a large hard disk for which the diameter is 95 mm or more, more suitably 96 mm or more, or even more suitably 97 mm or more. The present invention also encompasses a magnetic disk for which the outer diameter is 95 mm or more. The outer circumferential side of a magnetic disk greatly contributes to enlarging the area of a data region in particular. Therefore, a large, flat magnetic disk such as that according to the present invention is useful for realizing larger capacity. A magnetic disk according to the present invention displays a flatness in that ΔTIR is 0.50 μm/mm in a region for less than or equal to 0.99 times the outer circumferential radius, and thus can be used as a data region until the very limit of the outer circumferential edge of the disk. In light of this feature as well, a magnetic disk according to the present invention is particularly useful in realizing larger capacity for an HDD apparatus.

In addition, a magnetic disk according to the present invention can also be used as a magnetic disk regardless of the recording method therefor. For example, that which employs perpendicular magnetic recording (PMR) or shingled writes (SMR) is suitably used as a large-capacity magnetic disk for a data center. In order to realize a further increase in capacity, energy-assisted magnetic recording techniques such as heat-assisted magnetic recording (HAMR) or microwave-assisted magnetic recording (MAMR) have also been developed, and research using bit pattern media in order to further increase the recording density of a surface is also progressing. A magnetic disk according to the present invention is suitable for such an intended use.

A magnetic disk according to the present invention may be of any kind if the thickness is 0.60 mm or less and the ΔTIR is 0.50 μm/mm or less, as described above, and there is no particular limitation on the material thereof. A magnetic disk is typically manufactured by depositing a magnetic film on a substrate that is metallic, glass, resin, or the like. For a magnetic disk according to the present invention, there is no particular limitation on the material or method of depositing a magnetic film.

<Substrate>

The present invention also encompasses a substrate (substrate for a magnetic disk) that is used in a magnetic disk as described above. There is no particular limitation on the material of the substrate, which may include any kind of material as described above. A substrate is normally polished before depositing, but a substrate according to the present invention may be subjected to polishing by any kind of method or under any kind of condition. However, in order to achieve a configuration in which a magnetic disk according to the present invention has the flatness as described above, it is preferable to use a substrate that is a metallic substrate, particularly an aluminum alloy substrate, or a substrate that is formed from glass (may be simply referred to as an "aluminum alloy substrate" or a "glass substrate" in the description of the present application). An aluminum alloy substrate or a glass substrate has a lower risk of a defect occurring and also has good mechanical characteristics or workability, and thus is suitable as the substrate for a magnetic disk according to the present invention. In particular, it is preferable to use a glass substrate, which has superior heat resistance, as a substrate for a magnetic disk that uses HAMR. Each of a glass substrate and an aluminum alloy substrate can be used as a substrate for a magnetic disk that uses MAMR.

In addition, to planarize a substrate for a magnetic disk, it is desirable to polish the substrate by a method and under conditions that are suitable for the material of the substrate. Regarding an aluminum alloy substrate and a glass substrate, preferable materials in particular are exemplified below, and description is given regarding preferable polishing methods and conditions by taking these substrates as examples. Note that the material and methods of manufacturing a substrate are not limited to that described below.

<Aluminum Alloy Substrate>

The material of the aluminum alloy substrate is not particularly limited, and various publicly known materials can be used. For example, conventionally used alloys that contain elements such as magnesium (Mg), copper (Cu), zinc (Zn), or chromium (Cr) can be given, but there is no limitation to these. From a perspective of improving rigidity, an alloy that contains an element such as iron (Fe), manganese (Mn), or nickel (Ni) is preferable. More preferably, any alloy in the A5000s or A8000s, particularly A5086, is used. In the case of such an alloy, a defect is less likely to occur in the substrate, and sufficient mechanical characteristics can be imparted.

Examples of the specific composition of the abovementioned aluminum alloy include, for example, A5086 that contains Mg: 3.5 to 4.5%, Fe: 0.50% or less, Si: 0.40% or less, Mn: 0.20 to 0.7%, Cr: 0.05 to 0.25%, Cu: 0.10% or less, Ti: 0.15% or less, and Zn: 0.25% or less, and the remainder including Al and unavoidable impurities. A specific example of another composition of an aluminum alloy includes Mg: 1.0 to 6.5%, Cu: 0 to 0.070%, Zn: 0 to 0.60%, Fe: 0 to 0.50%, Si: 0 to 0.50%, Cr: 0 to 0.20%, Mn: 0 to 0.50%, Zr: 0 to 0.20%, and Be: 0 to 0.0020%, and the remainder including aluminum and unavoidable impurities. Furthermore, for example, 0.1% or less of an ingredient other than the components described above may be contained with respect to each element, with total 0.3% or less of the components contained. Note that for the compositions described above, every "%" means "% by mass".

As a substrate for a magnetic disk according to the present invention, it is possible to use an aluminum-iron alloy substrate. An aluminum-iron alloy typically contains Fe, which is an essential element, as well as one or two from among Mn and Ni, which are selective elements. More preferably, the total content of Fe, Mn, and Ni is 1.00 to 7.00% by mass, and even more preferably is an aluminum alloy that also includes one or more of Si: 14.0% by mass or less, Zn: 0.7% by mass or less, Cu: 1.0% by mass or less, Mg: 3.5% by mass or less, Cr: 0.30% by mass or less, and Zr: 0.20% by mass or less, and the remainder being aluminum, and unavoidable impurities or other trace elements. Such aluminum-iron alloys have a high rigidity and are less likely to deform, and thus are particularly useful as a substrate for a magnetic disk according to the present invention.

<Glass Substrate>

A glass substrate is less likely to suffer a defect, and has characteristics of having favorable mechanical properties and workability, and advantages of being less likely to plastically deform. Accordingly, a glass substrate is suitable as a substrate for a magnetic disk. The material of a glass substrate is not specifically limited. A glass ceramic, such as amorphous glass or crystallized glass can be used. Note that, from the perspective of the flatness, formability, or workability of the substrate, it is preferable to use amorphous glass. The material is not specifically limited. Examples of the material include aluminosilicate glass (aluminosilicate glass), soda-lime glass, soda-aluminosilicate glass, aluminoborosilicate glass, borosilicate glass (borosilicate glass), and further include physically strengthened glass, chemically strengthened glass and the like that have been subjected to a treatment, such as of air cooling or liquid cooling, but not limited thereto. Among them, aluminosilicate glass, particularly amorphous aluminosilicate glass, is preferable. A substrate made of such a material has excellent flatness and strength, and the long-term reliability thereof can also be favorable.

For example, aluminosilicate glass that contains $SiO_2$: 55 to 75% as a main ingredient, and contains $Al_2O_3$: 0.7 to 25%, $Li_2O$: 0.01 to 12%, $Na_2O$: 0.7 to 12%, $K_2O$: 0 to 8%, MgO: 0 to 7%, CaO: 0 to 10%, $ZrO_2$: 0 to 10%, and $TiO_2$: 0 to 1% is known. It is possible to use a substrate of such a material in the present invention. Note that for the compositions described above and below, every "%" means "% by mass".

In the glass composition described above, $SiO_2$ is a main component for forming a glass framework. If the content thereof is 55% or more, high chemical durability is more likely to be expressed. If the content thereof is 75% or less, there is a tendency that the melt temperature will not be too high, and forming is also facilitated.

$Al_2O_3$ is an ingredient that has an effect of improving the ability to exchange ions and chemical durability. In order to exercise these effects, it is preferable for the $Al_2O_3$ content to be 0.7% or more. If the $Al_2O_3$ content is 25% or less, there is no risk of reducing solubility and devitrification resistance. Accordingly, it is preferable to set the $Al_2O_3$ content to be 0.7 to 25%.

$Li_2O$ is an ingredient having effects of exchanging Na ions to thereby chemically strengthen glass, improving the fusibility and formability, and improving Young's modulus. To exhibit such effects, it is preferable that the $Li_2O$ content be 0.01% or more. If the $Li_2O$ content is 12% or less and particularly 6% or less, there is no risk of reducing devitrification resistance and the chemical durability. Accordingly, it is preferable to set the $Li_2O$ content to be 0.01 to 6%.

$Na_2O$ is an ingredient having effects of exchanging with K ions to thereby chemically strengthen glass, reducing high-temperature viscosity, improving fusibility and formability, and improving devitrification resistance. To exercise such effects, it is preferable to set the $Na_2O$ content to 0.7% or more. In addition, a case where the $Na_2O$ content is 12% or less is preferable because there is no risk of reducing the chemical durability and the Knoop hardness number.

Furthermore, $K_2O$, MgO, CaO, $ZrO_2$, and $TiO_2$ are optionally added ingredients, which can be included as needed. $K_2O$ is an ingredient having effects of reducing high-temperature viscosity and improving fusibility, formability, and devitrification resistance. However, if the $K_2O$ content exceeds 8%, there is a tendency that low-temperature viscosity decreases, the coefficient of thermal expansion increases, and impact resistance decreases. Accordingly, it is preferable to set the $K_2O$ content to be 0 to 8%.

MgO and CaO are components having effects of reducing high-temperature viscosity, improving solubility, clarity, and formability, and improving Young's modulus. In particular, CaO is included as an essential component in soda-lime glass. Here, MgO and CaO are expected to have effects of reducing high-temperature viscosity, improving solubility, clarity, and formability, and improving Young's modulus. If the MgO content exceeds 7% and/or the CaO content exceeds 10%, ion-exchange performance and devitrification resistance tend to decrease. Accordingly, it is preferable to set the MgO content to 7% or less, and set the CaO content to 10% or less.

$ZrO_2$ is an ingredient having effects of increasing Knoop hardness, and improving chemical durability or heat resistance. However, if the $ZrO_2$ content exceeds 10%, fusibility and devitrification resistance tend to decrease. Accordingly, it is preferable to set the $ZrO_2$ content to be 0 to 10%.

$TiO_2$ is an ingredient having effects of reducing high-temperature viscosity, improving fusibility, structure stabilization, and improving durability. However, if the $TiO_2$ content exceeds 1%, ion-exchange performance and devitrification resistance tend to decrease. Accordingly, it is preferable to set the $TiO_2$ content to be 0 to 1%.

Glass having the composition described above may further include not only $B_2O_3$ having effects of reducing the viscosity, and improving the solubility and clarity, SrO or BaO having effects of reducing the high-temperature viscosity, improving the solubility, clarity, and formability, and improving the Young's modulus, Zno that can improve the ion-exchange performance, and reduce the high-temperature viscosity without reducing the low-temperature viscosity, $SnO_2$ having effects of improving the clarity and the ion-exchange performance, and $Fe_2O_3$ that can function as a colorant, but also $As_2O_3$ and $Sb_2O_3$ as clarifying agents. Furthermore, oxides, such as lanthanum (La), phosphorus (P), cerium (Ce), antimony (Sb), hafnium (Hf), rubidium (Rb), and yttrium (Y) may be contained as trace elements. Note that $B_2O_3$ is contained as an essential component in alumino-borosilicate glass, and borosilicate glass. This glass may have a composition that contains $SiO_2$: 45 to 60%, $Al_2O_3$: 7 to 20%, $B_2O_3$: 1 to 8%, $P_2O_5$: 0.5 to 7%, CaO: 0 to 3%, $TiO_2$: 1 to 15%, BaO: 0 to 4%, and another oxide, such as MgO: 5 to 35%.

In the case of a glass substrate or aluminum alloy substrate having the composition as described above, high flatness is expressed and thermal deformation is less likely. Therefore, it is possible to manufacture a magnetic disk for which ΔTIR is 0.50 μm/mm while the thickness thereof is 0.60 mm or less. First, a representative aspect of a method of manufacturing such a flat aluminum alloy substrate from the aluminum alloy as described above is described as an example below.

<Method for Manufacturing Aluminum Alloy Substrate>

Figure 3:
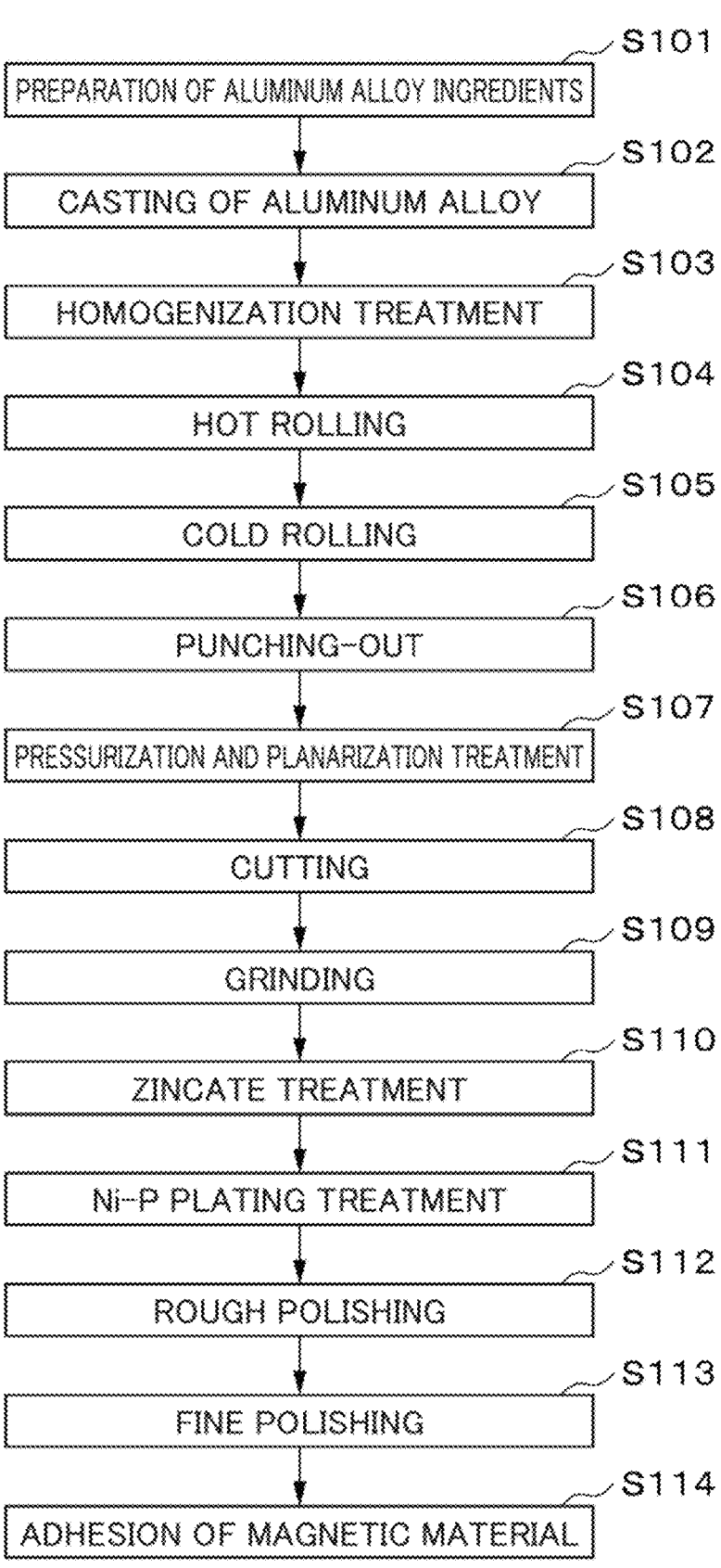
FIG. 3 is a flow chart that illustrates an example of steps for manufacturing an aluminum alloy substrate for a magnetic disk according to the present invention.

FIG. 3 is a flow chart that illustrates an example of steps for manufacturing an aluminum alloy substrate for a magnetic disk according to the present invention. In FIG. 3, an aluminum alloy component preparing step (step S101), an aluminum alloy casting step (step S102), a homogenization treatment step (step S103), a hot rolling step (step S104), and cold rolling (step S105) are steps for manufacturing an aluminum alloy material through melt casting, and forming an aluminum alloy plate from this material. Next, using a punching-out step at a press or the like (step S106), a disk (may be referred to as a "blank" below) that is formed from the aluminum alloy and has an inner diameter and outer diameter that are desired is manufactured (blanked), and is preferably subjected to a pressurization and planarization treatment step (step S107). Pretreatment, such as cutting and grinding steps (steps S108 and S109), is performed on the manufactured blank, and an annular aluminum alloy plate (referred to as a "substrate" or simply as a "sub" below) for which dimensions or the like have been adjusted is fabricated. A zincate treatment step (step S110), and an electroless Ni—P plating treatment step (step S111) are applied to the substrate, and an aluminum alloy substrate for a magnetic disk is fabricated. The manufactured aluminum alloy substrate for a magnetic disk is subjected to a rough polishing step (step S112) and a fine polishing step (step S113), and a magnetic disk is achieved through a magnetic material adhesion step (step S114). Hereinafter, according to the flow of FIG. 1, the content of each step is described in detail.

First, a molten metal of the aluminum alloy material having the ingredient composition described above is prepared by heating and melting according to the routine method (step S101). Next, the prepared molten metal of aluminum alloy material is cast according to a semi-continuous casting (DC casting) method, a continuous casting (CC casting) method, or the like, thus casting the aluminum alloy material (step S102). In particular, vertical semi-continuous casting is desirable. In the DC casting method and the CC casting method, an aluminum alloy material manufacturing condition and the like are as follows.

In the DC casting method, molten metal poured through a spout is deprived of heat by a bottom block, a water-cooled mold wall, and cooling water directly discharged onto an outer peripheral section of an ingot (ingot); solidifies; and is drawn downwardly as an aluminum alloy ingot.

In contrast, in the CC casting method, a casting nozzle is inserted between a pair of rolls (or a belt caster, or a block caster), molten metal is supplied, and heat is removed from the rolls, thus directly casting an aluminum alloy thin-plate.

A large difference between the DC casting method and the CC casting method is the rate of cooling when casting. The CC casting method, which has a faster rate of cooling, is characterized in that secondary phase particles have a smaller size than in DC casting.

The homogenization treatment is applied to a DC-cast aluminum alloy ingot as needed (step S103). When the homogenization treatment is applied, it is preferable to perform heat treatment at 280 to 620° C. for 0.5 to 30 hours, and it is more preferable to perform heat treatment at 300 to 620° C. for 1 to 24 hours. If the heating temperature of the homogenization treatment is less than 280° C. or the amount of heating time is less than 0.5 hours, there is a risk that the homogenization treatment will be insufficient, and the loss factor will greatly vary among individual aluminum alloy plates. If the heating temperature in the homogenization treatment exceeds 620° C., there is a risk that the aluminum alloy ingot will melt. Even if the amount of heating time of the homogenization treatment exceeds 30 hours, the effect thereof is saturated, and any further prominent improvement effect cannot be achieved.

Next, a (DC-cast) aluminum alloy ingot, which either has been or has not been subjected to the homogenization treatment as needed, is hot-rolled and employed as a plate material (step S104). Conditions for the hot rolling is not specifically limited. However, the hot rolling start temperature is preferably set to 250 to 600° C., and the hot rolling end temperature is preferably set to 230 to 450° C.

Next, a rolled plate that was subjected to hot rolling, or a cast plate that was cast by the CC casting method is cold-rolled, to thereby achieve an aluminum alloy plate of approximately 0.30 to 0.60 mm, for example (step S105). Conditions for cold rolling are not specifically limited, and may be defined in accordance with a required product plate strength and plate thickness. The rolling ratio is preferably set to 10 to 95%.

Note that it is preferable to apply an annealing treatment in order to secure cold rolling workability before the cold rolling or partway through the cold rolling. It is preferable to set the temperature of the annealing treatment to 250 to 500° C. or 300 to 450° C. in particular. Annealing treatment is performed under such conditions, whereby deformation is less likely to occur even in long-term use and a favorable flatness can be retained. More specific annealing conditions can be, for example, holding at 300 to 450° C. for 0.1 to 10 hours in batch heating, or holding at 400 to 500° C. for 0 to 60 seconds in continuous heating. Here, a holding time of 0 seconds means cooling immediately after a desired holding temperature is reached.

The aluminum alloy plate obtained by cold rolling is punched out into an annular shape by a press or the like, whereby an annular aluminum alloy plate (a blank) is formed (step S106). The annular aluminum alloy plate is preferably formed as a disk blank by blanking, pressurizing, and planarization treatment (step S107). Preferably, the blanking, pressurizing, and planarization treatment (also referred to as "press annealing") is performed at a temperature that is greater than or equal to the recrystallization temperature of the aluminum alloy with an applied pressure of approximately 30 to 60 kg/cm². For example, blanks are stacked together and held in ambient air at a temperature of 250 to 500° C. or 300 to 400° C. for approximately 0.5 to 10 hours or approximately 1 to 5 hours in particular, and pressurized, whereby planarized blanks are fabricated.

Next, a blank is cut to fabricate a disk that has a desired inner diameter, outer diameter, and chamfered section (may be referred to as a "T sub" below) (step S108). Here, it is possible to cut both surfaces of the blank and thereby achieve a T sub for which the thickness thereof has been adjusted. Furthermore, in order to remove processing distortion occurring inside material due to cutting, heat treatment under conditions of, inter alia, 150 to 350° C. for 0.1 to 10.0 hours, for example, may be applied to the T sub.

A grinding (grinding) step of grinding both main surfaces by a grinding machine or the like is applied to the obtained T sub to thereby fabricate a disk having a desired thickness (may be referred to as a "G sub" below) (step S109). After the present step, in order to remove processing distortion occurring inside material due to cutting, heat treatment under conditions of, inter alia, 150 to 350° C. for 0.1 to 10.0 hours, for example, may also be applied to the G sub. The problem of ΔTIR in the disk radial direction becoming large, which is a problem addressed by the present invention, is mainly due to the grinding step. Accordingly, grinding is described in detail below together with polishing.

Next, a disk (may be referred to as an "M sub" below) resulting from depositing plating having a desired thickness onto all surfaces of the G sub, including the front surface, side surface, and chamfered surface thereof is fabricated. Before this, pretreatment of the G sub is performed in order to improve plating adhesiveness.

A method of pretreating the G sub is not limited in particular. For example, the surface of the G sub is degreased, etched, and is subjected to the zincate treatment (Zn-substituting treatment) (step S108). The degreasing can be performed using, for example, the commercially available degreasing solution AD-68F (made by C. Uyemura & Co., Ltd.) or the like under conditions of a concentration of 200 to 800 mL/L at a temperature of 40 to 70° C. for an amount of treatment time of 3 to 10 minutes. For example, the etching may be performed by acid etching using, inter alia, the commercially available AD-107F (made by C. Uyemura & Co., Ltd.) etching solution under conditions of a concentration of 20 to 100 mL/L at a temperature of 50 to 75° C. for an amount of treatment time of 0.5 to 5 minutes. In the zincate treatment, a zincate film is formed on the surface of the substrate. The zincate treatment can use a commercially available zincate treatment solution. Preferably, the treatment is performed under the conditions of a concentration of 100 to 500 mL/L at a temperature of 10 to 35° C. for an amount of treatment time of 0.1 to 5 minutes. The zincate treatment is performed at least once, and may be performed two or more times. By performing the zincate treatment a plurality of times, Zn is finely deposited, and a uniform zincate film can be formed. In a case of performing zincate treatment two or more times, Zn stripping treatment may be performed therebetween. It is preferable for Zn stripping treatment to use a $HNO_3$ solution and be performed under conditions of concentration: 10 to 60%, temperature:

15 to 40° C., and amount of treatment time: 10 to 120 seconds (accordingly, is also referred to as "nitric acid stripping treatment"). Preferably, the second and subsequent zincate treatments are performed under conditions similar to that of the first zincate treatment.

Furthermore, plating treatment as base treatment for adhering magnetic material is applied to the surface of the substrate that was subjected to zincate treatment, and an M sub is fabricated (step S111). Electroless Ni—P plating treatment is preferable as the plating treatment. It is desirable for an electroless Ni—P plating treatment step to use a commercially available plating liquid, for example, Nimuden (registered trademark) HDX made by C. Uyemura & Co., Ltd., under conditions of Ni concentration: 3 to 10 g/L, temperature: 80 to 95° C., amount of treatment time: 30 to 180 minutes. In order to remove internal stress when plating, heat treatment under conditions of, inter alia, 280 to 295° C. and 15 to 60 minutes, for example, may be applied to the M sub. Because crystallization will progress and magnetism will be imparted when 300° C. is exceeded, the heating temperature must be less than 300° C.

Polishing treatment (steps S112 and S113) as described below is applied to both main surfaces of the M sub obtained in this manner to thereby achieve a substrate for a magnetic disk. A magnetic material is caused to adhere to the substrate (step S114), and is stacked as required, whereby a magnetic disk such as a hard disk can be manufactured. A method and conditions for polishing treatment are described in detail below together with those for grinding (grinding).

<Method for Manufacturing Glass Substrate>

Figure 4:
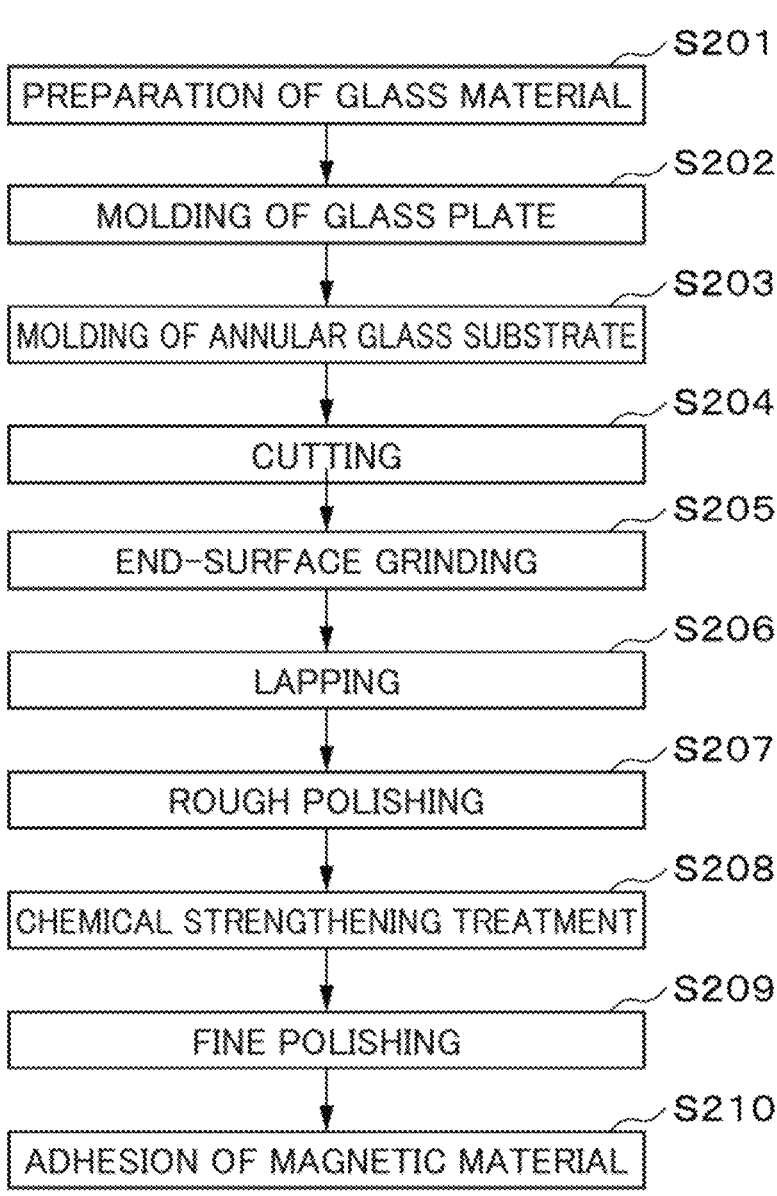
FIG. 4 is a flow chart that illustrates an example of steps for manufacturing a glass substrate for a magnetic disk, according to the present invention.

FIG. 4 is a flow chart that illustrates an example of steps for manufacturing a glass substrate for a magnetic disk, according to the present invention. First, a glass plate having a predetermined thickness is prepared (steps S201 and S202). Next, the prepared glass plate is subjected to coring, and end surface polishing is applied to the inner and outer circumferences to form and process an annular glass substrate (steps S203 to S205). Next, a grinding (lapping) step (step S206), which desirably uses diamond pellets or the like, is applied to the shaped glass substrate. Subsequently, or after step S205 depending on the state of the glass substrate, a rough polishing step of collectively clamping the glass substrates from the top and bottom with polishing pads, and simultaneously polishing the plurality of glass substrates with, for example, cerium oxide abrasive grains is performed (step S207), and after a chemical strengthening treatment (step S208) is applied as desired, a fine polishing step (step S209) with, for example, colloidal silica abrasive grains is performed. Next, a magnetic material adhesion step (step S210) is used to manufacture a magnetic disk. The details of each step are described in detail below while following the flow in FIG. 4.

First, a melt of the glass material having the ingredient composition described above is prepared by heating and melting according to a routine method (step S201). Next, the prepared melt of the glass material is shaped into a glass plate by a publicly known manufacturing method, such as the float method, down draw method, direct pressing method, redraw method, or fusion method (step S202). Here, it is preferable to use the redraw method of heating and softening a base-material glass plate manufactured using the float method or the like and drawing the plate to have a desired thickness because a glass plate having a small variation in thickness can be comparatively easily manufactured. However, a method of forming a glass plate is not limited to the redraw method and, for example, may be shaped by the direct pressing method in which a molten lump is shaped by pressing from both surfaces to fabricate a glass plate that has a desired thickness.

Next, an annular glass substrate is shaped by the coring step from the glass plate obtained in step S202 (step S203). Cutting and end-surface grinding (steps S204 and S205) may be used to polishing the end surfaces of inner and outer circumferences. The formed glass substrate (glass blank) becomes an annular plate that has two main surface planes, and a circular hole is shaped at the center thereof.

Annealing treatment (annealing treatment) may be applied to the obtained glass blank. For example, the annealing treatment can be performed by holding the glass blank at a temperature near the strain point for approximately 15 minutes or more, and gradually cooling for approximately 3 to 12 hours. The temperature for the time of the annealing treatment depends on the glass material, but is preferably set to 250 to 750° C. or 500 to 700° C. in particular. Annealing treatment is performed under such conditions, whereby deformation is less likely to occur even in long-term use and a favorable flatness can be retained. More specific annealing conditions can be, for example, holding at 500 to 650° C. for 0.1 to 10 hours in batch heating, or holding at 500 to 750° C. for 0 to 60 seconds in continuous heating. Here, a holding time of 0 seconds means cooling immediately after a desired holding temperature is reached. For example, the glass substrate according to the present invention can be manufactured by forming the commercially available glass plate having the composition as described above into an annular shape and applying the annealing treatment.

Next, in step S206, a grinding (lapping) step of grinding both main surfaces by a grinding machine or the like is applied to the formed annular plate, whereby the plate thickness is adjusted. Note that depending on the plate thickness of the glass substrate obtained in the steps up to step S205, the lapping step S206 may be omitted, and the process may transition to the following polishing step. For example, a glass plate manufactured by the redraw method typically has low thickness variation and thus there are cases where the lapping step S206 can be omitted, but performing lapping is desirable in order to planarize the substrate. If the glass plate is manufactured by the float method or the direct pressing method, it is highly necessary to perform the lapping step S206. The lapping step can be performed using, for example, a batch-type double-sided polishing machine that uses diamond pellets. Here, the problem of $\Delta$TIR in the disk radial direction becoming large, which is a problem addressed by the present invention, is mainly due to the lapping step for a glass substrate. Accordingly, the lapping step is separately described in detail below.

The following polishing treatment (steps S207 to S209) is applied to the surface of the glass substrate (blank substrate) obtained as described above, and the substrate for a magnetic disk is thus obtained. A magnetic material is caused to adhere to the substrate (step S210), and is stacked as desired, whereby a magnetic disk such a hard disk can be manufactured.

The abovementioned polishing treatment steps are broadly divided into a rough polishing step (step S207) and a fine polishing step (step S209), as described below. It is desirable to perform chemical strengthening treatment (step S208) on the glass substrate between the rough polishing step and the fine polishing step. By chemical strengthening, lithium ions and sodium ions on the surface layer of the glass substrate are substituted respectively with sodium ions and potassium ions that have relatively large ion radii in a chemical strengthening liquid. As a result, a compressive stress layer is formed in the surface layer portion, thus allowing the glass substrate to be strengthened. The chemical strengthening treatment method is not specifically limited, and for example, can be performed by soaking the glass substrate in the chemical strengthening liquid heated to 300 to 400° C. for approximately 3 to 4 hours. Here, the chemical strengthening liquid is not particularly limited. For example, it is possible to use, inter alia, a potassium nitrate solution, a sodium sulfate solution, or a mixed solution of these, particularly a liquid mixture having potassium nitrate at 60 wt % and sodium sulfate at 40 wt %. Note that it is preferable for the glass substrate to be cleaned before the chemical strengthening treatment, and preheated to approximately 200 to 300° C. Preferably, the chemically strengthened glass substrate is subjected to cleaning treatment. For example, after cleaning with an acid, such as sulfuric acid, cleaning may be further performed with pure water or the like.

<Grinding/Polishing Treatment>

In a process for fabricating a substrate, as described above, normally grinding (grinding) is performed in the manufacture of an aluminum alloy substrate, and lapping is desirably performed in the manufacture of a glass substrate. Typically, the substrate for a magnetic disk is subjected to polishing treatment for planarization before magnetic material adhesion, regardless of the material of the substrate. In this polishing step, it is preferable to perform polishing in a plurality of stages in which the diameters of the polishing abrasive grains have been adjusted. It is desirable for such grinding (grinding or lapping), rough polishing, and fine polishing to be typically performed using a double-sided simultaneous polishing machine. It is also possible to use a commercially available batch-type double-sided simultaneous polishing machine to grind or polish a substrate for a magnetic disk according to the present invention. Note that, before grinding/polishing treatment and particularly before rough polishing, it is preferable to perform dummy polishing to thereby manage polishing pad surfaces.

(Double-Sided Polishing Machine)

A double-sided simultaneous polishing machine ordinarily includes: an upper surface plate and a lower surface plate that are made of cast iron; a carrier that holds a plurality of substrates between the upper surface plate and the lower surface plate; and polishing pads or grindstones attached respectively to substrate contact surfaces of the upper surface plate and the lower surface plate. Normally, in polishing treatment, a plurality of substrates are held between the upper surface plate and the lower surface plate by the carrier, and each substrate is clamped at a predetermined processing pressure by the upper surface plate and the lower surface plate. The substrates are collectively clamped from the top and bottom by the polishing pads or grindstones. Next, while a polishing liquid or coolant is being supplied between the polishing pads and the individual substrates at a predetermined supply rate, the upper surface plate and the lower surface plate are rotated in different directions. At this time, the carrier also rotates on its own axis in accordance with a sun gear. Accordingly, the substrates undergo planetary motion. As a result, each substrate slides on the surfaces of the polishing pads or grindstones, and both surfaces thereof are simultaneously polished.

(Carrier)

There is no particular limitation on the material or dimensions of a carrier that is used in double-sided polishing, and a general-purpose carrier can be used. From a perspective of the strength of the carrier, a carrier that is made of a resin such as an aramid resin or an epoxy resin is desirably used. In order to improve the strength, a fibrous reinforcement material such as carbon fibers or glass fibers may be included. The thickness of the carrier can be discretionarily selected in accordance with the thickness of the disk, which is an artifact to be processed. However, when the carrier is too thin, there is a risk that the strength thereof will be insufficient and the carrier will be damaged during grinding. Accordingly, the thickness of the carrier is preferably approximately 0.3 mm or more, and more preferably approximately 0.4 mm or more.

[Grinding (Grinding) of Aluminum Alloy Substrate]

In grinding step (grinding step, step S109) for the aluminum alloy substrate, a double-sided polishing machine such as that described above is used to push fixed abrasive grains referred to as a grindstone from above and below against the substrate which is held by the carrier while causing the fixed abrasive grains to rotate, to thereby perform grinding on both main surfaces of the substrate.

[Grinding (Lapping) of Glass Substrate]

In grinding step (lapping step, step S206) for the glass substrate, a double-sided polishing machine such as that described above is used to push a grindstone from above and below against the substrate which is held by the carrier while causing the grindstone to rotate, to thereby enable grinding to be performed on both main surfaces of the substrate.

[Grinding Conditions]

(Polishing Surface Plate Rotation Speed, Etc.)

In the grinding as well as the lapping, a coolant is applied to the substrate, carrier, and grindstone. In order to achieve a smooth substrate, it is preferable to set the rotation speed of a grinding surface plate (grindstone) to within the range 10 to 35 rpm or within 15 to 30 rpm in particular. When the rotation speed is too fast, there are cases where the grindstone does not stabilize and the shape deteriorates. In addition, when the rotation speed is too fast, a difference in the amount of coolant arises between an inner circumferential section and outer circumferential section of the substrate, or between an inner circumferential section and outer circumferential section of the surface plate. In detail, coolant is discharged by centrifugal force in accordance with the rotation of the surface plate, but coolant that should contribute to grinding on the outer circumferential side is discharged and it is not possible to realize a desired TIR, and consequentially ΔTIR deteriorates. In addition, a case where the rotation speed is low is not preferable because productivity worsens.

The rotation speed of the sun gear is not particularly limited, and can be set to 5 to 15 rpm, for example. Note that it is preferable for grinding to be for approximately 1 to 10 minutes and approximately 2 to 5 minutes in particular, and set the amount of grinding to approximately 2.5 to 25 μm, for example, approximately 5 to 20 μm. In addition, face milling may be performed before grinding.

(Grindstone)

The grindstone is formed from abrasive grains and a binder that bonds the abrasive grains. In grinding of an aluminum alloy substrate, Si—C particles as abrasive grains and a porous sponge-like elastic body such as PVA as a binder are suitably used. A grindstone used to lap a glass substrate may result from, inter alia, using a binder to join abrasive grains such as diamond particles, for example. In grinding as well as lapping, a cut groove may be made in the grindstone in order to improve the ability to discharge grinding waste that occurs in grinding.

As describe above, the lack of planarization of a substrate, in other words the deterioration of the shape thereof, is mainly due to a grinding step (grinding or lapping step). According to findings by the inventors, the main cause of the deterioration of the shape of a substrate is uneven grindstone congestion. This occurs due to grinding waste, which occurs when grinding, being deposited on the surface of the grindstone. In a case where uneven grindstone congestion has occurred, grinding of the substrate surface will not be uniform, which invites deterioration of the shape of the surface. When grinding, the grinding liquid is discharged from the outer circumferential section on the main surface, but the outer circumferential region has a relatively large area, and thus is greatly impacted by grinding unevenness. Accordingly, if grindstone congestion is suppressed, shape deterioration can be suppressed, and it becomes possible to reduce operational errors in an HDD apparatus that is equipped with a magnetic disk. As a method of preventing grindstone congestion, inter alia, methods for adding a cut groove as described above, or periodically shaving (dressing) the surface of the grindstone before the grindstone becomes congested are effective.

(Pressurization of Grindstone)

As a method of suppressing grindstone congestion apart from that described above, for example, in order to improve the ability to discharge grinding waste, it is effective to apply pressure, as appropriate, to the substrate of a double-sided polishing apparatus (a grinding apparatus or a lapping apparatus) surface plate. When the pressure it too high, processing distortion is applied, whereby the shape of the substrate deteriorates and the coolant flow path is restricted as a result of the surface of the grindstone being pressed against the substrate surface. In particular, in a case where the coolant flow rate is low, discharge of grinding waste is delayed, and grinding will be performed while the grinding waste remains on the surface of the grindstone and the substrate surface.

It is preferable for loading pressure (applied pressure) to be specifically 50 to 120 g/cm$^2$ in the case of an aluminum alloy substrate. When the applied pressure exceeds 120 g/cm$^2$, there are cases where a portion of the grindstone elastically deforms and parallelism between the substrate and the grindstone breaks down. Accordingly, ΔTIR can become large as a result of a difference arising in the pressures applied to the inner circumferential section and the outer circumferential section of the aluminum alloy substrate, and TIR deteriorating. In addition, when the applied pressure exceeds 120 g/cm$^2$ and the coolant flow path is restricted as described above, it may be that the coefficient of friction between the aluminum alloy substrate and the grindstone increases, rotation of the substrate becomes jerky, uniform grinding becomes less likely, and the flatness exceeds 20 μm. Furthermore, it is preferable for the applied pressure to be 70 to 110 g/cm$^2$ or 75 to 100 g/cm$^2$ in particular.

In addition, in the case of a glass substrate, it is preferable for the loading pressure (applied pressure) to be specifically 100 to 200 g/cm$^2$. A glass substrate typically has a higher Vickers hardness than an aluminum alloy substrate, and thus it is possible to set a higher applied pressure. However, when the applied pressure exceeds 200 g/cm$^2$, there are cases where ill effects of ΔTIR becoming large arise as with an aluminum alloy substrate described above. Furthermore, when the applied pressure for a glass substrate exceeds 200 g/cm$^2$, there are cases where scratching occurs due to abrasive grains digging into and cutting the substrate, and there arises the need to increase a machining allowance for the S206 lapping step or a later polishing step. Accordingly, an upper limit is preferably set to 200 g/cm$^2$. The applied pressure for a glass substrate is more preferably 130 to 200 g/cm$^2$.

(Coolant)

Supplying coolant at an appropriate flow rate is effective in order to suppress grindstone congestion. Coolant is used for the purpose of, inter alia, cooling heat generated by grinding, improving lubricity, and improving the ability to discharge grinding waste. It is preferable for the coolant flow rate to be approximately 1 to 10 L/minute, and more preferably approximately 3 to 5 L/minute. When the coolant flow rate is insufficient, there are cases where grinding waste is insufficiently discharged and the shape of the substrate deteriorates. In more detail, when the coolant flow rate is low, there are cases where there arise, on the substrate, a portion that is in contact with fresh coolant and is properly ground, and a portion that is in contact with degraded coolant and has a lower amount of cutting. In particular, coolant is insufficient at an outer circumferential section where the coolant is discharged, TIR deteriorates because the amount of grinding is uneven, and $\Delta$TIR tends to become large. In addition, there are cases where the ability to uniformly cut the entirety of the substrate is impaired, and thus the flatness deteriorates.

In addition, coolant is discharged outside of the surface plate by centrifugal force in accordance with the rotation of the surface plate, but in the case where the coolant flow rate is high, it may be that an amount of coolant that does not contribute to grinding increases and invites a decrease in productivity. Therefore, it is preferable to set the upper limit to 10 L/minute.

There is no particular limitation on the material of the coolant, and it is possible to use a general-purpose product such as Mechano aqua cut ECO #408 (product name) made by Ohtomo-chemical Ins., Corp. Here, a surfactant, a lubricant, or the like is added to the coolant, whereby it becomes possible to fabricate a substrate having superior planarity.

It is possible to increase the coolant flow rate and the rotation speed of the surface plate, which are described above, to certain levels to thereby improve the amount of cutting (this is referred to as cutting ability) per unit amount of time, but if further increased there are cases where the cutting ability decreases for the rotation speed of the surface plate or the cutting ability peaks out for the coolant flow rate. Desired values are determined for these two parameters with a focus on the applied pressure. In a manufacturing method according to the present invention, to realize a desired $\Delta$TIR, it was found that the applied pressure being 100 to 200 g/cm$^2$, the surface plate rotation speed being 10 to 35 rpm, and the coolant flow rate being 1 L/minute or more and 10 L/minute or less was suitable for an aluminum alloy substrate, and the applied pressure being 50 to 120 g/cm$^2$, the surface plate rotation speed being 10 to 35 rpm, and the coolant flow rate being 1 L/minute or more and 10 L/minute or less was suitable for a glass substrate.

In other words, the present invention encompasses a method of manufacturing the above-described magnetic disk, the magnetic disk being manufactured from an aluminum alloy substrate, the method of manufacturing the magnetic disk having a grinding step of grinding the aluminum alloy substrate, and the grinding step being characterized in being performed under the conditions of the applied pressure being 50 to 120 g/cm$^2$, the surface plate rotation speed being 10 to 35 rpm, and the coolant flow rate being 1 to 10 L/minute.

The present invention also encompasses a method of manufacturing the above-described magnetic disk, the magnetic disk being manufactured from a glass substrate, the method of manufacturing the magnetic disk having a grinding step of grinding the glass substrate, and the grinding step being characterized in being performed under the conditions of the applied pressure being 100 to 200 g/cm$^2$, the surface plate rotation speed being 10 to 35 rpm, and the coolant flow rate being 1 to 10 L/minute.

[Rough Polishing]

The rough polishing treatment method is not specifically limited, and can be performed under any condition depending on the material of the substrate. For example, the rough polishing of the aluminum alloy substrate can be performed using a polishing liquid containing alumina having particle sizes of 0.1 to 1.0 $\mu$m, and polishing pads made of hard or soft polyurethane or the like. The rough polishing of the glass substrate can be performed using a polishing liquid containing cerium oxide having particle sizes of 0.1 to 1.0 $\mu$m, and polishing pads made of hard polyurethane or the like. For example, instead of alumina and cerium oxide described above, abrasive grains made of silica, zirconium oxide, SiC, diamond or the like with a desired particle size may be used. Note that hard means having a hardness (Asker C) of 85 or greater, as measured by a measurement method defined by a Society of Rubber Science and Technology, Japan standard (compliance standard: SRIS0101), and soft means having a hardness of 60 to 80.

Specific rough polishing conditions are affected also by the material of the substrate that is used and by steps to application of the rough polishing (for example, steps S101 to S111 in manufacturing of the aluminum alloy substrate, and steps S201 to S206 in manufacturing of the glass substrate), and are difficult to be unambiguously determined. There is no limitation to any specific condition. For example, for rough polishing conditions for the aluminum alloy substrate, it is possible to set an amount of polishing time to be 2 to 5 minutes, set a polishing surface plate rotation speed to 10 to 35 rpm, set a sun gear rotation speed to 5 to 15 rpm, set a polishing liquid supply rate to 1 to 5 L/minute, set a processing pressure to 20 to 250 g/cm$^2$ or 30 to 120 g/cm$^2$ in particular, and set a polishing amount (machining allowance) to 2.5 to 3.5 $\mu$m.

Rough polishing conditions for the glass substrate are not specifically limited either. It is preferable to, for example, use hard polishing pads having a hardness of 86 to 88, set the polishing surface plate rotation speed to 10 to 35 rpm or 15 to 30 rpm in particular, set the sun gear rotation speed to 5 to 15 rpm, set the polishing liquid supply rate to 1 to 5 L/minute or 2 to 4 L/minute in particular, set the processing pressure to 20 to 250 g/cm2 or 30 to 120 g/cm$^2$ in particular, and set the amount of polishing time to 2 to 10 minutes. The amount of polishing (a machining allowance) is not limited in particular, but is preferably set to approximately 2 to 50 $\mu$m, for example, to approximately 5 to 25 $\mu$m.

(Dummy Polishing)

In the polishing treatment, it may be that dummy polishing is performed and the surfaces of the polishing pads are managed before the rough polishing as described above. Typically, the dummy polishing step is performed in the same manner as in the rough polishing step, preferably under the same conditions thereof using a dummy substrate. The dummy substrate to be used is not specifically limited. For example, before the rough polishing of the glass substrate, dummy polishing can be performed using the aluminum alloy substrate. It is preferable to use a blank substrate of the same type as that for a product, in particular, a blank substrate manufactured under the conditions similar to those of a blank substrate for a product. In the dummy polishing step, it is desirable to polish such that $\Delta$TIR for at least one surface of the dummy substrate becomes 0.50 μm/mm or less, or such that the flatness PV becomes 20.0 μm or less, for example.

By dummy polishing as described above, the surfaces of the polishing pads used for the rough polishing step described above can be adjusted to a suitable state. Note that the dummy polishing is an optional step. If the surfaces of the polishing pads are adjusted or managed, the step may be omitted. For example, before a rough polishing lot is started, the dummy polishing is performed, which enables a plurality of batches of rough polishing of the blank substrate for a product to be repetitively performed, with the adjusted polishing pads.

(Fine Polishing)

A method of fine polishing (polishing) is not specifically limited, and may be performed according to any of various publicly known methods. For example, the fine polishing of an aluminum alloy substrate can be performed using a polishing liquid containing colloidal silica with a particle size of approximately 0.01 to 0.10 μm, and soft polishing pads. The fine polishing of a glass substrate can be performed using a polishing liquid containing colloidal silica with a particle size of approximately 0.01 to 0.10 μm, in particular, approximately 10 to 50 nm, and softer polishing pads that are made from urethane foam or the like. It is a matter of course that conditions for fine polishing are not limited to these. Abrasive grains of cerium oxide, zirconium oxide, SiC, diamond or the like that have a desired particle size may be used. By such treatment, the main surface planes of the substrate are polished to mirror surfaces, thus manufacturing a substrate for a magnetic disk. The substrate for a magnetic disk according to the present invention having passed through the above-described polishing step has a favorable flatness even after a thermal impact test, and exhibits a prescribed PV value. Note that the polished substrate is preferably cleaned using a neutral detergent, pure water, IPA or the like.

Specific conditions for fine polishing are also affected by the material of the substrate used and steps before the rough polishing. Accordingly, it is difficult to unambiguously determine conditions. There is no limitation to a specific condition. For example, in the fine polishing of the aluminum alloy substrate, it is possible to set the amount of polishing time to 2 to 5 minutes, set the polishing surface plate rotation speed to 10 to 35 rpm, set the sun gear rotation speed to 5 to 15 rpm, set the polishing liquid supply rate to 1000 to 5000 mL/minute, set the processing pressure to, for example, 10 to 200 g/cm² or 20 to 100 g/cm² in particular, and set the amount of polishing to 1.0 to 1.5 μm.

Conditions for fine polishing of a glass substrate are not specifically limited either. For example, it is preferable to, for example, use soft polishing pads having a hardness of 75 to 77, set the polishing surface plate rotation speed to 10 to 35 rpm, set the sun gear rotation speed to 5 to 15 rpm, set the polishing liquid supply rate to 1000 to 5000 mL/minute, set the processing pressure to, for example, 10 to 200 g/cm² or 20 to 100 g/cm² in particular, and set the amount of polishing time to 2 to 12 minutes. The amount of polishing, for example, can be set to approximately 2 to 50 μm, and to approximately 5 to 25 μm in particular.

(Flipping)

Here, when manufacturing a substrate for a magnetic disk according to the present invention, the front and rear surfaces of the substrates may be inverted (flipped) partway through a grinding step (grinding step or lapping step) and/or a polishing step. In other words, in a grinding step, the front and rear surfaces of the aluminum alloy substrate or glass substrate are inverted at least once before continuing grinding. Alternatively, a polishing step of polishing the aluminum alloy substrate or glass substrate is also performed after a grinding step and, in the polishing step, the front and rear surfaces of the aluminum alloy substrate or glass substrate are inverted at least once and then polishing is continued. As a result, it becomes easier to process a ground/polished substrate to be flatter. Preferably, flipping is performed partway through a rough polishing step, and particularly partway through a grinding step and a rough polishing step.

In double-sided polishing, there is a tendency for a layer thickness that is shaved away by polishing to differ between the upper surface plate side of the substrate and the lower surface plate side thereof. In particular, in rough polishing, the tendency is high. There are cases where flatness worsens when fabricating a magnetic disk by a substrate that is polished in this manner. Flipping is performed in a grinding/polishing step, particularly partway through a rough polishing step, whereby the risk of deformation of the magnetic disk is reduced. Note that it is sufficient if flipping is only performed once in a grinding or polishing step, but flipping may be performed two or more times. Preferably, flipping is performed so that both surfaces of the substrate can be in contact respectively with the polishing pads on the upper surface plate side and the lower surface plate side under the same condition. For example, in the case of performing flipping once, the grinding/polishing rate and the amount of polishing time are made the same before and after the flipping. In the case of performing flipping a plurality of times, it is sufficient if polishing is performed such that the total of amounts of time in which each surface is oriented upward and the total of amounts of time in which the corresponding surface is oriented downward are aligned.

<Method of Evaluating Magnetic Disk and Substrate>

As a result of going through grinding/polishing steps, and particularly grinding (grinding or lapping) steps as described above, it is possible to manufacture a substrate that is for a magnetic disk and for which ΔTIR is 0.50 μm/mm or less while the thickness there of is 0.60 mm or less. A magnetic disk according to the present invention is thin and flat, and thus it is possible for fewer crashes to occur inside an HDD apparatus and reduce operational errors. Note that a magnetic disk can be evaluated using a method in which, for example, a head is caused to fly over the magnetic disk, which rotates, and a signal from the magnetic disk is detected by the head. A magnetic disk that has passed this evaluation test is supplied to a subsequent HDD step, but when the plate thickness of the magnetic disk is approximately 0.60 mm or less than or equal to, the pass rate generally decreases. According to findings by the inventors, such an evaluation test result is related to ΔTIR, which is the rate of change of TIR in the radial direction. A magnetic disk according to the present invention has a ΔTIR of 0.50 μm/mm or less and a good surface shape that is flat, and thus is able to pass an evaluation test such as that described above, even if the plate thickness is 0.60 mm or less.

Note that, according to findings by the inventors, the surface shape of a substrate and a magnetic disk essentially does not change before and after a magnetic film is formed. Accordingly, it is preferable for the measurement of ΔTIR to be performed for, inter alia, a polished aluminum alloy substrate or glass substrate, before a magnetic film is formed. In other words, it is preferable to perform evaluation of ΔTIR or PV as described above as a substrate inspection step after the substrate is manufactured. In addition, as described above, the surface shape of a magnetic disk is mainly caused by a grinding step in the case of an aluminum alloy substrate or by a lapping step in the case of a glass substrate and, for both substrates, is influenced by many factors such as the distribution of plate thickness within the substrate or internal stress that occurs when processing. Accordingly, it is more preferable if it is possible to evaluate a substrate after grinding (grinding) or lapping ends, and it is possible to immediately confirm substrate quality for each processing batch.

The embodiment of the present invention has thus been described above. However, the present invention is not limited by the embodiment described above, encompasses every possible aspect included in the concept of the present invention and the claims, and can be variously modified within the scope of the present invention.

EXAMPLES

The present invention is described below in further detail based on examples. However, the present invention is not limited to these examples.

Example 1

A substrate that is for a magnetic disk made of an aluminum alloy, has a thickness of 0.50 mm, and an outer diameter of 97 mm was fabricated as follows. An Al—Mg alloy was used in example 1.

Firstly, an ingot is fabricated using a semi-continuous casting method, and this is subjected to hot rolling and cold rolling to thereby fabricate a plate material having a thickness of 0.52 mm. This plate material is subjected to punching by a press, whereby blanks having an inner diameter of 24 mm and an outer diameter of 98 mm are achieved. Next, blanks are stacked together, and press annealing treatment is performed for three hours at 320° C. under pressure of 30 kg/cm². Next, an inner diameter section and an outer diameter section of these blanks are subjected to cutting and chamfering by a lathe to thereby fabricate a T sub having an inner diameter of 25 mm and an outer diameter of 97 mm, to which heat treatment at 300° C. for 30 minutes is performed. Next, grind processing (grinding) is performed on both surfaces of the T sub by a grinding machine to fabricate a G sub having a thickness of 0.48 mm. This G sub is subjected to pretreatment, and subsequently subjected to electroless Ni—P plating treating to add a Ni—P plating layer having a thickness of 10 μm per single surface to thereby achieve an M sub. Next, heat treatment for 30 minutes at 250° C. is performed, and subsequently both surfaces of the M sub are polished by a polishing machine to thereby achieve a substrate that is for a magnetic disk made of an aluminum alloy.

Note that the abovementioned pretreatment and electroless Ni—P plating treatment for the G sub were performed as follows.

(Pretreatment)

The degreasing treatment was performed using, for example, the AD-68F degreasing solution made by C. Uyemura & Co., Ltd., under the conditions of concentration: 500 mL/L, temperature: 45° C., and amount of treatment time: 3 minutes.

The acid etching treatment was performed using, for example, the AD-107F etching solution made by C. Uyemura & Co., Ltd., under the conditions of concentration: 50 mL/L, temperature: 60° C., and amount of treatment time: 2 minutes.

The zincate treatment was performed twice with nitric acid stripping treatment in between. Specifically, the treatments were sequentially performed in an order of first zincate treatment, pure water cleaning, nitric acid stripping treatment, pure water cleaning, and second zincate treatment. The first zincate treatment was performed using, for example, the AD-301F-3X zincate treatment solution made by C. Uyemura & Co., Ltd., under the conditions of concentration: 200 mL/L, temperature: 20° C., and amount of treatment time: 1 minute. The nitric acid stripping treatment was performed under the conditions of nitric acid concentration: 30% by volume, temperature: 25° C., and amount of treatment time: 1 minute. The second zincate treatment was performed under the same conditions as those of the first zincate treatment.

(Electroless Ni—P Plating Treatment)

Using Nimuden (registered trademark) HDX electroless plating liquid made by C. Uyemura & Co., Ltd. and performed under the conditions Ni concentration: 6 g/L, temperature: 88° C., and treatment time: 130 minutes.

In addition, the abovementioned grinding was performed under the following conditions.

(Grinding)

Grindstone: #4000 silicon carbide (SiC) grindstone
Processing pressure: 100 g/cm²
Rotation speed of polishing surface plate: 30 rpm
Coolant flow rate: 3.5 L/minute
Amount of grinding time: 5 minutes All of the polishing described above was performed under the following conditions and by using double-sided polishing.

(Rough Polishing)

Abrasive grains: alumina abrasive grains having a particle size of 0.4 μm
Polishing pad: hard urethane polishing pad having a hardness of 87
Processing pressure: 100 g/cm²
Rotation speed of polishing surface plate: 30 rpm
Rotation speed of sun gear: 10 rpm
Polishing liquid supply rate: 3.5 L/minute
Amount of grinding time: 5 minutes (Fine Polishing)

Abrasive grains: colloidal silica abrasive grains having a particle size of 0.08 μm
Polishing pad: urethane foam polishing pad having a hardness of 76
Processing pressure: 100 g/cm²
Rotation speed of polishing surface plate: 30 rpm
Rotation speed of sun gear: 10 rpm
Polishing liquid supply rate: 3.5 L/minute
Amount of grinding time: 3 minutes Regarding a substrate for a magnetic disk, using a Mesa optical measurement apparatus made by Zygo Corp., TIR was measured at circumferences at which the radial distance r from the center=40 mm, 45 mm, 46 mm, and 47 mm, and ΔTIR was calculated in accordance with the above-described (formula 1) for adjacent radial distances. In a case where all of the three calculated ΔTIRs were within 0.5 μm, the overall evaluation was set to good (indicated by circle symbol (○)), and in a case where even one of the three calculated ΔTIRs exceeded 0.5 μm, the overall evaluation was set to poor (indicated by cross symbol (x)). In addition, the same Mesa optical measurement apparatus made by Zygo Corp. was used to measure flatness PV. These results are indicated in Table 1, which is described below, together with grinding conditions.

Examples 2 to 4 and Comparative Examples 1 to 3

A substrate for a magnetic disk made of an aluminum alloy was fabricated as described below, in the same manner as in Example 1.

Examples 2 and 4 and comparative examples 1 to 3: Al—Fe alloy; and

Example 3: Al—Mg alloy. Apart from increasing the coolant flow rate when grinding to 10.0 L/minute, similar operations to those in Example 1 were performed (Example 2). In addition, apart from setting the plate thickness of the aluminum alloy substrate to 0.60 mm (Example 3) or setting the processing pressure to 70 g/cm² (Example 4), similar operations to those in Example 1 were performed. Furthermore, apart from changing the processing pressure when grinding to 150 g/cm² (Comparative Example 1, changing the rotation speed of a polishing surface plate to 40 rpm (Comparative Example 2), or changing the coolant flow rate to 0.1 L/minute (Comparative Example 3), similar operations to those in Example 1 were performed. Evaluation results for each of the obtained substrates for magnetic disks are indicated in Table 1, which is described below, together with the substrate material and grinding conditions.

Example 5

A substrate that is for a magnetic disk made of aluminosilicate glass, has a thickness of 0.60 mm, and an outer diameter of 97 mm was fabricated as follows.

The above-described glass material was heated at 1600 to 1700° C. to achieve a melt, and was shaped using the redraw method into an aluminosilicate glass plate of 100 mm and a length of 10 m. Subsequently, a glass plate with a thickness close to 0.6 mm was selected, subjected to coring, and the end surfaces of the inner and outer circumferences were polished (cutting of the inner and outer diameters of the glass disk, dimension adjustment, chamfering process, and grinding process to chamfered portions), thus forming an annular glass plate with an outer diameter of 97 mm and a circular hole inner diameter of 25 mm. With respect to this glass plate, a double-sided polishing machine was used to perform grinding (lapping), rough polishing, and fine polishing to fabricate the glass substrate.

The above-described lapping was performed under the following conditions.

(Lapping)
    Grindstone: diamond pellets
    Processing pressure: 150 g/cm²
    Rotation speed of polishing surface plate: 30 rpm
    Coolant flow rate: 3.5 L/minute
    Amount of grinding time: 5 minutes The above-described rough polishing and fine polishing treatment were both performed using double-sided polishing under the following conditions.

(Rough Polishing)
    Abrasive grains: cerium oxide polishing abrasive grains having a particle size of 0.1 to 0.4 μm and an average particle size of 0.19 μm
    Polishing pad: hard urethane polishing pad having a hardness of 87
    Machining pressure: 160 g/cm²
    Rotation speed of polishing surface plate: 15 rpm
    Rotation speed of sun gear: 10 rpm
    Polishing liquid supply rate: 2.0 L/minute
    Amount of grinding time: 5 minutes (Fine Polishing)
    Abrasive grains: colloidal silica abrasive grains having a particle size of 10 to 100 nm and an average particle size of 80 nm
    Polishing pad: urethane foam polishing pad having a hardness of 76
    Processing pressure: 100 g/cm²
    Rotation speed of polishing surface plate: 30 rpm
    Rotation speed of sun gear: 10 rpm
    Polishing liquid supply rate: 3.5 L/minute
    Amount of grinding time: 5 minutes In the same manner as in Example 1, ΔTIR and flatness PV were evaluated for an obtained substrate for a magnetic disk made of aluminosilicate glass. The evaluation results are described in Table 1 together with grinding (lapping) conditions.

TABLE 1

| | [Material, grinding conditions, and evaluation results for each sample] | | | | | | ΔTIR[6] | | | |
| | Substrate for magnetic disk | | | | | | r1 = 40, r2 = 45[6a] | r1 = 45, r2 = 46[6b] | r1 = 46, r2 = 47[6c] | Overall |
| | Material | Thickness[1] | Pressure[2] | Rotation[3] | Coolant[4] | PV[5] | | | | Decision |
| Example 1 | Aluminum alloy (Al—Mg) | 0.50 | 100 | 30 | 3.5 | 11.2 | 0.17 | 0.17 | 0.26 | ○ |
| Example 2 | Aluminum alloy (Al—Fe) | 0.50 | 100 | 30 | 10.0 | 10.3 | 0.07 | 0.13 | 0.19 | ○ |
| Example 3 | Aluminum alloy (Al—Mg) | 0.60 | 100 | 30 | 3.5 | 5.6 | 0.14 | 0.15 | 0.27 | ○ |
| Example 4 | Aluminum alloy (Al—Fe) | 0.50 | 70 | 30 | 3.5 | 20.3 | 0.47 | 0.41 | 0.45 | ○ |
| Comparative Example 1 | Aluminum alloy (Al—Fe) | 0.50 | 150 | 30 | 3.5 | 21.3 | 0.36 | 0.45 | 0.61 | x |

TABLE 1-continued

[Material, grinding conditions, and evaluation results for each sample]

| | Substrate for magnetic disk | | | | | | ΔTIR[6] | | | |
| | | | | | | | r1 = 40, r2 = 45[6a] | r1 = 45, r2 = 46[6b] | r1 = 46, r2 = 47[6c] | Overall Decision |
| | Material | Thickness[1] | Prressure[2] | Rotation[3] | Coolant[4] | PV[5] | | | | |
| Comparative Example 2 | Aluminum alloy (Al—Fe) | 0.50 | 100 | 40 | 3.5 | 26.3 | 0.45 | 0.74 | 0.14 | x |
| Comparative Example 3 | Aluminum alloy (Al—Fe) | 0.50 | 100 | 30 | 0.1 | 21.0 | 0.74 | 0.90 | 1.43 | x |
| Comparative Example 5 | Alumino-silicate | 0.60 | 150 | 30 | 3.5 | 12.8 | 0.12 | 0.22 | 0.39 | o |

[1]Plate thickness (mm)
[2]Processing pressure (g/cm$^2$)
[3]Surface plate rotation speed (rpm)
[4]Coolant flow rate (L/min.)
[5]Flatness (μm)
[6]Rate of change in radial direction for TIR on two circles having radial distances r1 and r2 indicated by rows directly below
[6a]ΔTIR in case where r1 = 40 mm, r2 = 45 mm (r1/R = 0.82, r2/R = 0.93)
[6b]ΔTIR in case where r1 = 45 mm, r2 = 46 mm (r1/R = 0.93, r2/R = 0.95)
[6c]ΔTIR in case where r1 = 46 mm, r2 = 47 mm (r1/R = 0.95, r2/R = 0.97)

In accordance with the present invention, a very flat substrate for a magnetic disk for which ΔTIR is 0.50 μm/mm or less while being thin and having a thickness thereof of 0.60 mm or less is provided. Such substrates are flat and many can be mounted to an HDD apparatus. The outer diameter thereof is large at 97 mm, and a wide data region on the surface thereof can be achieved. The substrates for magnetic disks in Examples 1 to 3 display a good surface shape and have a flatness PV of 20.0 μm or less. Therefore, it is understood that magnetic disks based on these substrates can reduce physical errors when incorporated in an HDD apparatus, and can also support an increase in the capacity of a hard disk.

In contrast, in Comparative Example 1, the applied pressure with respect to the aluminum alloy substrate was high. Therefore, a difference in applied pressure arose in accordance with the position within the aluminum alloy substrate, and TIR deteriorated. As a result, ΔTIR deteriorated. In Comparative Example 2, the grindstone was not stable because the rotation speed of the surface plate was too fast, and coolant that should have contributed to grinding on the outer circumferential side was discharged. As a result, TIR varied in accordance with the measurement location, and ΔTIR deteriorated. In Comparative Example 3, the coolant flow rate was low. Therefore, grinding waste was not sufficiently discharged, TIR deteriorated as a whole, and ΔTIR deteriorated.

Since a glass substrate was used in Example 5, TIR was good even when the applied pressure was 150 g/cm$^2$. As a result, a very flat substrate for a magnetic disk was provided for which ΔTIR was 0.50 μm/mm.

EXPLANATION OF REFERENCE NUMERALS

1 Magnetic disk
2 Center of magnetic disk 1
C1 Circle, which is for measuring TIR1 and for which the radial distance measured from the center 2 of the magnetic disk 1 is r1
C2 Circle, which is for measuring TIR2 and for which the radial distance measured from the center 2 of the magnetic disk 1 is r2

Ca Outer circle that indicates an outer circumferential region in the magnetic disk 1
Cb Inner circle that indicates an outer circumferential region In the magnetic disk 1

The invention claimed is:

1. A magnetic disk that has a hole at a central portion of the magnetic disk,
wherein the magnetic disk has
a thickness of 0.60 mm or less,
a radius denoted by R (mm),
Total Indicated Reading (TIR)s measured on circles having different radial distances r1 (mm) and r2 (mm) on the magnetic disk denoted by TIR1 (μm) and TIR2 (μm), respectively, and
an amount of radial variation ΔTIR for TIRs of 0.50 μm/mm or less in an outer circumferential region of the magnetic disk at which r/R is 0.70 to 0.99,
where "r" is a radial distance (mm) on the magnetic disk that is measured from the center of the magnetic disk, TIR for a specific radial distance is the difference between the highest point and the lowest point at a circumference of the specific radial distance on a plane fitted to a main surface of the magnetic disk by least squares, and the ΔTIR is represented by |(TIR1−TIR2)/(r1−r2)|, which is an absolute value of a ratio of a difference (TIR1−TIR2) between the TIR1 and the TIR2 with respect to a difference (r1−r2) between the radial distance r1 of the magnetic disk and the radial distance r2 of the magnetic disk.

2. The magnetic disk according to claim 1, wherein a flatness PV, which is the difference between the highest point and the lowest point over the entirety of the plane fitted to the main surface of the magnetic disk, is 20.0 μm or less.

3. The magnetic disk according to claim 2, wherein an outer diameter dimension is 95 mm or more.

4. A substrate used for the magnetic disk according to claim 2.

5. The magnetic disk according to claim 1, wherein an outer diameter dimension is 95 mm or more.

6. A substrate used for the magnetic disk according to claim 5.

7. A substrate used for the magnetic disk according to claim 1.

8. A method of manufacturing the magnetic disk according to claim 1, wherein the magnetic disk is manufactured from an aluminum alloy substrate, the method of manufacturing the magnetic disk comprises a grinding step of grinding the aluminum alloy substrate, and the grinding step is performed under conditions of an applied pressure being 50 to 120 g/cm2, a surface plate rotation speed being 10 to 35 rpm, and a coolant flow rate being 1 to 10 L/minute.

9. The method of manufacturing a magnetic disk according to claim 8, wherein, in the grinding step, an amount of grinding is 2.5 to 25 μm.

10. The method of manufacturing a magnetic disk according to claim 9, further comprising, after the grinding step, a polishing step of polishing the aluminum alloy substrate or the glass substrate, wherein the polishing step includes flipping the aluminum alloy substrate or the glass substrate over at least once, and the flipping is followed by continuing the polishing.

11. The method of manufacturing a magnetic disk according to claim 8, wherein the grinding step includes flipping the aluminum alloy substrate or the glass substrate over at least once, and the flipping is followed by continuing the griding.

12. The method of manufacturing a magnetic disk according to claim 11, further comprising, after the grinding step, a polishing step of polishing the aluminum alloy substrate or the glass substrate, wherein the polishing step includes flipping the aluminum alloy substrate or the glass substrate over at least once, and the flipping is followed by continuing the polishing.

13. The method of manufacturing a magnetic disk according to claim 8, further comprising, after the grinding step, a polishing step of polishing the aluminum alloy substrate or the glass substrate, wherein the polishing step includes flipping the aluminum alloy substrate or the glass substrate over at least once, and the flipping is followed by continuing the polishing.

14. A method of manufacturing the magnetic disk according to claim 1, wherein the magnetic disk is manufactured from a glass substrate, the method of manufacturing the magnetic disk comprises a grinding step of grinding the glass substrate, and the grinding step is performed under conditions of an applied pressure being 100 to 200 g/cm2, a surface plate rotation speed being 10 to 35 rpm, and a coolant flow rate being 1 to 10 L/minute.

15. The method of manufacturing a magnetic disk according to claim 14, wherein, in the grinding step, an amount of grinding is 2.5 to 25 μm.

16. The method of manufacturing a magnetic disk according to claim 14, further comprising, after the grinding step, a polishing step of polishing the aluminum alloy substrate or the glass substrate, wherein the polishing step includes flipping the aluminum alloy substrate or the glass substrate over at least once, and the flipping is followed by continuing the polishing.

17. A method of manufacturing the magnetic disk according to claim 2, wherein the magnetic disk is manufactured from an aluminum alloy substrate, the method of manufacturing the magnetic disk comprises a grinding step of grinding the aluminum alloy substrate, and the grinding step is performed under conditions of an applied pressure being 50 to 120 g/cm2, a surface plate rotation speed being 10 to 35 rpm, and a coolant flow rate being 1 to 10 L/minute.

18. A method of manufacturing the magnetic disk according to claim 2, wherein the magnetic disk is manufactured from a glass substrate, the method of manufacturing the magnetic disk comprises a grinding step of grinding the glass substrate, and the grinding step is performed under conditions of an applied pressure being 100 to 200 g/cm2, a surface plate rotation speed being 10 to 35 rpm, and a coolant flow rate being 1 to 10 L/minute.

19. A method of manufacturing the magnetic disk according to claim 5, wherein the magnetic disk is manufactured from an aluminum alloy substrate, the method of manufacturing the magnetic disk comprises a grinding step of grinding the aluminum alloy substrate, and the grinding step is performed under conditions of an applied pressure being 50 to 120 g/cm2, a surface plate rotation speed being 10 to 35 rpm, and a coolant flow rate being 1 to 10 L/minute.

20. A method of manufacturing the magnetic disk according to claim 5, wherein the magnetic disk is manufactured from a glass substrate, the method of manufacturing the magnetic disk comprises a grinding step of grinding the glass substrate, and the grinding step is performed under conditions of an applied pressure being 100 to 200 g/cm2, a surface plate rotation speed being 10 to 35 rpm, and a coolant flow rate being 1 to 10 L/minute.

\* \* \* \* \*